United States Patent [19]

Clampitt

[11] 3,727,689
[45] Apr. 17, 1973

[54] HYDRAULIC FRACTURING
[75] Inventor: Richard L. Clampitt, Bartlesville, Okla. 74004
[73] Assignee: Phillips Petroleum Company, Bartlesville, Okla.
[22] Filed: Feb. 9, 1972
[21] Appl. No.: 224,946

[52] U.S. Cl.................................166/283, 166/307
[51] Int. Cl.........................E21b 43/26, E21b 43/27
[58] Field of Search..................166/281, 282, 283, 166/270, 294, 295, 308, 307; 252/8.55 R

[56] References Cited

UNITED STATES PATENTS

| | | | |
|---|---|---|---|
| 3,254,719 | 6/1966 | Root | 166/308 |
| 3,343,602 | 9/1967 | Knox et al. | 166/308 X |
| 3,370,650 | 2/1968 | Watanabe | 166/283 X |
| 3,405,062 | 10/1968 | Kuhn | 166/283 X |
| 3,502,149 | 3/1970 | Pence, Jr. | 166/295 |
| 3,520,313 | 7/1970 | Seymour | 166/308 X |
| 3,700,032 | 10/1972 | Terry et al. | 166/283 |

Primary Examiner—Stephen J. Novosad
Attorney—Quigg and Oberlin

[57] ABSTRACT

Improvements in hydraulic fracturing of underground porous formations penetrated by a well bore are accomplished by the use of fracturing fluids comprising aqueous gels prepared from water or brines and certain polyacrylamides and related polymers.

31 Claims, No Drawings

HYDRAULIC FRACTURING

This invention relates to hydraulic fracturing.

Hydraulic fracturing of subterranean formations penetrated by a bore hole has been widely employed for increasing the production of hydrocarbon fluids, e.g., crude oil, natural gas, from said formations. Hydraulic fracturing comprises the injection of a fracturing fluid down a well penetrating a formation, and into said formation under sufficient pressure to overcome the pressure exerted by the overburden. This results in creating a fracture in said formation which facilitates flow of hydrocarbons through the formation and into the well.

Desirable properties of a hydraulic fracturing fluid include high viscosity, low fluid loss, low friction loss during pumping into the well, stability under the conditions of use such as in high temperature deep wells, and ease of removal from the fracture and well after the operation is complete. It would be desirable to have a fracturing fluid possessing all of these properties.

Higher viscosities for the fracturing fluid aids in producing wider fractures. This is particularly advantageous when a viscous solution is used as a "pad" preceding the acid in combination fracturing-acidizing operations. More viscous solutions also aid in carrying propping agents into the formation when propping agents are used. The common thickener agents of the prior art such as the natural gums (guar gums, etc.) and starches require excessive amounts for worthwhile viscosity increases. Furthermore, solutions of said gums and starches are not viscosity stable at the higher temperatures encountered in deeper wells, e.g., above about 200° F.

The fluid loss properties of the fracturing fluid must be low enough to permit build-up and maintenance of the pressures necessary to fracture the formation. Otherwise, low penetration and/or ineffective fractures will be obtained. Various fluid loss control agents have been proposed in the past for use with various fracturing fluids. However, at best, the use of such fluid loss control agents is an undesirable complicating factor in the preparation and use of fracturing fluids. It would be better to have a fracturing fluid which does not require the use of a fluid loss control agent.

Low friction loss is desirable so as to avoid excessive well head pressures in pumping the fracturing fluid through the casing and tubing and then into the formation. Otherwise, the frictional losses can become prohibitive.

Stability under conditions of use, e.g., retention of sufficient viscosity at temperatures in the order of 200° F. and higher for a period of time sufficient to carry out the fracturing operation, is particularly important when the formations penetrated by deep high temperature wells are being fractured. Fracturing fluids prepared from many of the prior art thickener materials have little more viscosity than the viscosity of water at temperatures of 200° F., and higher.

The ease of removal of the fracturing fluid from the formation is highly important. One disadvantage of using many highly viscous solutions is that they are difficult to remove from the pores or the fracture after the operation is completed. Other high viscosity solutions sometimes leave a clogging residue in the pores of the formation. This inhibits production and often requires costly clean-up operations after the fracturing operation is completed. It would be desirable to have a thickened solution which would break down to a lesser viscosity within a short time after the fracturing job is complete.

The present invention provides a solution for the above-discussed problems. The present invention provides methods of fracturing porous formations employing aqueous gels prepared by gelling solutions of certain polyacrylamides, and related polymers, as described further hereinafter. Said aqueous gels have the above-desirable properties.

Thus, according to the invention, there is provided a method of fracturing a subterranean porous formation penetrated by a wellbore, which method comprises injecting down the well and into said formation, at a pressure sufficient to fracture the formation, a fracturing fluid comprising an aqueous gel, and wherein said gel comprises water to which there has been added: a water thickening amount of a water-dispersible polymer selected from the group consisting of: polyacrylamides and polymethacrylamides wherein up to about 75 percent of the carboxamide groups can be hydrolyzed to carboxyl groups; crosslinked polyacrylamides and crosslinked polyacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substituents which contain from one to four carbon atoms; copolymers of acrylamide with another ethylenically unsaturated monomer copolymerizable therewith, sufficient acrylamide being present in the monomer mixture to impart said water-dispersible properties to the resulting copolymer when it is mixed with water, and wherein up to about 75 percent of the carboxamide groups can be hydrolyzed to carboxyl groups; and mixtures of said polymers; a sensible amount of a water-soluble compound of a polyvalent metal wherein the metal present is capable of being reduced to a lower polyvalent valence state and which is sufficient to gel said water when the valence of at least a portion of said metal is reduced to said lower valence state; and an amount of a water-soluble reducing agent which is effective to reduce at least a portion of said metal to said lower valence state.

Thus, one embodiment of the invention comprises using said aqueous gels as the fracturing fluid. In the practice of the invention, the aqueous gels can be injected down the well and into the porous formation employing conventional pumping equipment and procedures. If desired, the fracturing fluids used in the practice of the invention can be injected into a selected portion or portions of the porous formation. Said selected portion(s) of the formation can be isolated by employing one or more well packers at proper locations using packers and methods known in the art.

The amount of said fracturing fluid injected into the formation will depend upon the type of formation being treated, the thickness of the formation, the depth or penetration of fracturing desired, etc. Generally speaking, the use of any suitable amount is within the scope of the invention. Thus, the invention is not limited to the use of any particular amount of said aqueous gels as the fracturing fluid. Amounts used in using other fracturing fluids known to the art can be used. Thus, the amount of fracturing fluid can include any amount from 1 to 2,000, or more, gallons per vertical foot of formation.

Another embodiment of the invention comprises a combination fracturing-acidizing treatment. This embodiment of the invention is particularly useful where the formation is susceptible to attach by the acid. In this combination method of the invention the aqueous gels of cellulose ether solutions are used as fracturing "pads" and are injected, prior to injection of the acid, at sufficient pressure to create the fracture. The acid is subsequently injected to react with, etch, and roughen the fracture faces to provide good conductivity when the operation is completed.

In combination fracturing-acidizing treatments it is highly desirable that good penetration of the acid into the formation and good etching of the fracture faces be obtained. This is a problem under almost all circumstances. The severity of the problem increases as the well temperature increases because the acid reactivity with the formation increases with temperature. This results in a reduction in the amount of live acid penetration. Acid penetration can also be reduced by leak-off at the fracture faces. The acid will naturally react in some of the pores adjacent to the fracture. In extreme cases there may be so-called "worm holing" perpendicular to the fracture face. Another cause of acid leak-off is the presence of natural fractures in the formation being treated.

The aqueous gels used in the practice of the invention are particularly well suited to be used as a fracturing pad in combination fracturing-acidizing treatments. Said gels serve several purposes. They reduce the apparent acid reaction rate by reducing contact rate. Said aqueous gels will coat the faces of the fracture. Thus, when the aqueous gel pad is displaced by the acid a thin film will remain sufficiently long to retard the acid reaction rate an amount sufficient to obtain greater penetration. The acid soon destroys the film gel and performs its intended function of etching and roughening the fracture faces, but not before its action has been retarded sufficiently to permit a greater quantity of live acid to penetrate further into the fracture.

Another valuable purpose of the viscous aqueous gels used in the practice of the invention is that they increase fracture width and length. This provides a greater fracture face for the acid to work on, resulting in fractures having greater conductivity. Fracture width is dependent to a large extent upon the viscosity of the fracturing fluid. As shown in the examples given hereinafter, the aqueous gels used in the practice of the invention have superior high temperature viscosity properties when compared to commercially available gels. These superior viscosity properties result in superior fractures. Still another advantage of the superior viscosity properties is that said gels will carry more and larger propping agents in those embodiments of the invention where propping agents are employed.

Still another purpose served by said aqueous gels is that they serve to cool the well piping during injection, thereby overcoming the limitation of corrosion inhibitors used in the acid.

Propping agents which can be used in the practice of the invention include any of those known in the art, e.g., sand grains, walnut shell fragments, tampered glass beads, aluminum pellets, and similar materials. Generally speaking, it is desirable to use propping agents having particle sizes in the range of 8 to 40 mesh (U.S. Sieve Series). However, particle sizes outside this range can be employed. Propping agents are generally not used in the combination fracturing-acidizing treatments described herein. However, it is within the scope of the invention to use propping agents in said combination treatment. When propping agents are so used they should be made of materials which are not severely attacked by the acid used.

Acids useful in the practice of the invention include any acid which is effective in increasing the flow of hydrocarbons through the formation and into the well. Examples of acids which can be used include inorganic acids such as hydrochloric acid, nitric acid, and sulfuric acid; organic acids such as acetic acid, and formic acid; and combinations of inorganic and organic acids. The concentration or strength of the acid can vary depending upon the type of acid, the type of formation being treated, and the results desired in the particular treating operation. For example, when hydrochloric acid solution is being used in a predominantly limestone formation, the concentration can vary from about 5 to about 38 weight percent HCl, with concentrations within the range of 10 to 30 weight percent usually preferred. Organic acids are usually used in lower concentrations, e.g., about 10 weight percent. One preferred mixture of inorganic acids and organic acids comprises mixtures of hydrochloric acid and acetic acid. For example, 15 percent hydrochloric acid solution containing sufficient acetic acid to bring the total acidity to about 20 to 22 percent, based on equivalent HCl. The acids used in the practice of the invention can contain any of the known corrosion inhibitors, deemulsifying agents, sequestering agents, surfactants, friction reducers, etc., known in the art. The amount of acid used in any particular instance will depend upon a number of factors including the size or amount of formation to be treated, the type of formation being treated, the type of acid, the concentration of the acid, and the formation temperature. Thus, the invention is not limited to using any particular amount of acid in the combination fracturing-acidizing embodiment of the invention. Any suitable amount from about 1 to 750, or more, gallons of acid per vertical foot of formation can be used.

The fracturing operation in accordance with the invention can be carried out in one or more stages. A stage can comprise the following steps. If desired, depending upon the well conditions, the injection of the aqueous gel can be preceded by a small slug of clean-up acid to remove scale, wax deposits, etc., and clean the perforations. This clean-up acid injection can be followed with a preflush of water to cool the casing and the formation. The aqueous gel is then injected. Usually, the acid injection follows the injection of the aqueous gel. The acid slug is then followed with an overflush of water to displace the acid. The second, and any succeeding stages, can comprise the same steps carried out in the same order.

However, it is to be understood the invention is not to be limited to the above combination of steps. Thus, in the embodiments of the invention comprising injecting a gelled solution of a polyacrylamide or a related polymer as the fracturing fluid, the only essential step is the injection of the aqueous gel under sufficient pressure to create the fracture. The injection of the aqueous gel can be preceded by any suitable preflush injection steps, etc., and can be followed by any suitable subsequent overflush or other clean-up steps. Similarly, in the combination fracturing-acidizing method of the invention the only essential steps are the injection of the aqueous gel and the subsequent injection of the acid. Generally speaking, in said combination treatment it is preferred to inject the acid immediately following the injection of the aqueous gel fracturing fluid. However, it is within the scope of the invention to inject a slug of water or other spacer liquid between the slug of aqueous gel and the slug of acid.

Herein and in the claims, unless otherwise specified, the term "polymer" is employed generically to include both homopolymers and copolymers; and the term "water-dispersible polymers" is employed to include those polymers which are truly water-soluble and those polymers which are dispersible in water or other aqueous medium to form stable colloidal suspensions which can be gelled as described herein.

Polymers which can be used to prepare gels for use in the practice of the invention include the various polyacrylamides and related polymers which are water-dispersible and which can be used in an aqueous medium, with the gelling agents described herein, to give an aqueous gel. Presently preferred polymers include the various substantially linear homopolymers and copolymers of acrylamide and methacrylamide. By substantially linear it is meant that the polymers are substantially free of crosslinking between the polymer chains. Said polymers can have up to about 75, preferably up to about 45, percent of the carboxamide groups hydrolyzed to carboxyl groups. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Substantially linear polyacrylamides can be prepared by methods known in the art. For example, the polymerization can be carried out in aqueous medium, in the presence of a small but effective amount of a water-soluble oxygen-containing catalyst, e.g., a thiosulfate or bisulfate of potassium or sodium or an organic hydroperoxide, at a temperature between about 30° and 80° C. The resulting polymer is recovered from the aqueous medium, as by drum drying, and can be subsequently ground to the desired particle size. A presently preferred particle size is such that about 90 weight percent will pass through a number 10 mesh sieve, and not more than about 10 weight percent will be retained on a 200 mesh sieve (U.S. Bureau of Standards Sieve Series).

Included among the copolymers which can be used to prepare gels for use in the practice of the invention are the water-dispersible copolymers resulting from the polymerization of a major proportion of acrylamide or methacrylamide and a minor proportion of an ethylenically unsaturated monomer copolymerizable therewith. It is desirable that sufficient acrylamide or methacrylamide be present in the monomers mixture to impart to the copolymer the above-described water-dispersible properties, for example, from about 90 to 99 percent acrylamide and from about 1 to 10 percent other ethylenically unsaturated monomers. Such other monomers include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, and the like. Various methods are known in the art for preparing said copolymers. For example, see U.S. Pat. Nos. 2,625,529; 2,740,522; 2,729,557; 2,831,841; and 2,909,508. Said copolymers can also be used in the hydrolyzed form, as discussed above for the homopolymers.

Polyacrylic acids, including polymethacrylic acid, prepared by methods known in the art, can also be used to prepare gels for use in the practice of the invention.

Polyacrylates, e.g., as described in Kirk-Othmer, "Encyclopedia of Chemical Technology," Vol. 1, second edition, pages 305 et seq., Interscience Publishers, Inc., New York (1963), can also be used to prepare gels for use in the practice of the invention. Examples of said polyacrylates include polymers of methyl acrylate, ethyl acrylate, n-propyl acrylate, isopropyl acrylate, n-butyl acrylate, isobutyl acrylate, tert-butyl acrylate, n-octyl acrylate, and the like.

Polymers of N-alkyl-substituted acrylamides wherein the nitrogen atoms in the carboxamide groups can have from 1 to 2 alkyl substituents which contain one to four carbon atoms can also be used to prepare gels for use in the practice of the invention. Examples of said N-substituted acrylamides include, among others, N-methyl acrylamide, N-propyl acrylamide, N-butyl acrylamide, N,N-dimethyl acrylamide, N-methyl-N-sec-butyl acrylamide, and the like, at various stages of hydrolysis, as described above.

Crosslinked polyacrylamides and crosslinked polymethacrylamides, at various stages of hydrolysis as described above, can also be used to prepare gels for use in the practice of the invention. In general, said crosslinked polyacrylamides can be prepared by the methods described above, but including in the monomeric mixture a suitable amount of a suitable cross-linking agent. Examples of crosslinking agents include methylenebisacrylamide, divinylbenzene, vinyl ether, divinyl ether, and the like. Said crosslinking agents can be used in small amounts, e.g., up to about 1 percent by weight of the monomeric mixture. Such crosslinking is to be distinguished from any crosslinking which occurs when solutions of polymers are gelled as described herein.

In preparing aqueous gels for use in the practice of the invention, it is desirable for economic and other reasons to use water which is readily available in the field. Frequently, the only readily available water is field brine, produced from wells in the field, and containing large amounts of total dissolved solids. As discussed further hereinafter, the amount of dissolved solids contained in such brines affects the gelling rate and the life span or stability of the gel. In some instances it has been impossible to obtain gels when using strong brines. It has been discovered that for best results when using brines containing large amounts of total dissolved solids, the polyacrylamide or related polymer which is used should be one wherein not more than about 14, preferably not more than about 12, percent of the carboxamide groups have been hydrolyzed to carboxyl groups. Such polymers comprise a subgroup of polymers for use in the practice of the invention.

Said subgroup of polymers includes: polyacrylamides and polymethacrylamides wherein from 0.1 to about 14 percent of the carboxamide groups are hydrolyzed to carboxyl groups; crosslinked polyacrylamides and crosslinked polyacrylamides wherein from 0.1 to about 14 percent of the carboxamide groups are hydrolyzed to carboxyl groups; copolymers of acrylamide with another ethylenically unsaturated monomer copolymerizable therewith, sufficient acrylamide being present in the monomer mixture to impart said water-dispersible properties to the resulting copolymer when it is mixed with water, and wherein from 0.1 to about 14 percent of the carboxamide groups are hydrolyzed to carboxyl groups; and mixtures of said polymers.

All the polymers useful in preparing gels for use in the practice of the invention are characterized by high molecular weight. The molecular weight is not critical so long as the polymer has the above-described water-dispersible properties. It is preferred that the polymer have a molecular weight of at least 100,000. The upper limit of molecular weight is unimportant so long as the polymer is water-dispersible, and the aqueous gel prepared therefrom can be pumped. Thus, polymers having molecular weights as high as 20,000,000 or higher, and meeting said conditions, can be used.

The amount of the above-described polymers used in preparing gels for use in the practice of the invention can vary widely depending upon the particular polymer used, the purity of said polymer, and properties desired in said aqueous gels. In general, the amount of polymer used will be a water-thickening amount, i.e., at least an amount which will significantly thicken the water to which it is added. For example, amounts in the order of 25 to 100 parts per million weight (0.0025 to 0.01 weight percent) have been found to significantly thicken water. Distilled water containing 25 ppm of a polyacrylamide having a molecular weight of about 10 $\times 10^6$ has a viscosity increase of about 41 percent. At 50 ppm the viscosity increase is about 106 percent. At 100 ppm the viscosity increase is about 347 percent. As another example, distilled water containing 25 ppm of a polyacrylamide having a molecular weight of about 3.5 $\times 10^6$ has a viscosity increase of about 23 percent. At 50 ppm the viscosity increase is about 82 percent. At 100 ppm the viscosity increase is about 241 percent. Generally speaking, amounts of the above-described polymers in the range of from 0.0025 to 5, preferably from 0.01 to 1.5, more preferably 0.025 to 0.4, weight percent, based on the weight of water, can be used in preparing gels for use in the practice of the invention. However, amounts outside said ranges can be used. In general, with the proper amounts of polyvalent metal and reducing agent, the amount of polymer used will determine the consistency of the gel obtained. Small amounts of polymer will usually produce liquid mobile gels which can be readily pumped. Large amounts of polymer will usually produce thicker, more viscous, somewhat elastic gels. If desired, said thick gels can be "thinned" by dilution with water to any desired concentration of polymer. This can be done by mechanical means, e.g., stirring, pumping, or by means of a suitable turbulence inducing device to cause shearing, such as a jet nozzle. Thus, there is really no fixed upper limit on the amount of polymer which can be used.

However, it has been discovered that when a liquid mobile gel is desired, it is definitely preferred to first prepare a concentrated gel and dilute the more concentrated gels before they become too viscous. In general, dilute gels are more difficult to prepare in that, for one thing, gelling times are longer. Another advantage is that, in general, less gelling agents are required for a given viscosity.

Metal compounds which can be used in preparing gels for use in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds. The hexavalent chromium in said chromium compounds is reduced in situ to trivalent chromium by suitable reducing agents, as discussed hereinafter. In the permanganate compounds the manganese is reduced from +7 valence to +4 valance as in $MnO_2$.

The amount of said metal-containing compounds used will be a sensible amount, i.e., a small but finite amount which is more than incidental impurities, but which is effective or sufficient to cause subsequent gellation when the metal in the polyvalent metal compound is reduced to a lower polyvalent valence state. The lower limit of the concentration of the starting metal-containing compound will depend upon several factors including the particular type of polymer used, the concentration of the polymer in the water to be gelled, the water which is used, and the type of gel product desired. For similar reasons, the upper limit on the concentration of the starting metal-containing compound also cannot always to precisely defined. However, it should be noted that excessive amounts of the starting metal compound, for example +6 chromium, which can lead to excessive amounts of +3 chromium when there is sufficient reducing agent present to reduce the excess +6 chromium, can adversely affect the stability of the gels produced. As discussed further hereinafter, this provides one valuable method for controlling gel stability or life span so as to obtain gels which will break down with time and/or temperature to permit ready well clean-up subsequent to a fracturing operation. As a general guide, the amount of the starting polyvalent metal-containing compound used in preparing aqueous gels for use in the practice of the invention will be in the range of from 0.05 to 60, preferably 0.5 to 40, weight percent of the amount of the polymer used. Stated another way, the amount of the starting polyvalent metal-containing compound used will usually be an amount sufficient to provide at least about $3 \times 10^{-6}$, preferably at least $3 \times 10^{-5}$, gram atoms of said metal capable of being reduced per gram of polymer. Preferably, the amount of said metal capable of being reduced which is used will not exceed $4 \times 10^{-3}$, more preferably $2 \times 10^{-3}$, gram atoms of said metal per gram of polymer. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure. For example, when brines, such as are commonly available in producing oil fields, are used in the water in preparing gels for use in the practice of the invention, less of the starting polyvalent metal-containing compound is required than when distilled water is used. Suitable gels can be prepared using brines having a wide range of dissolved solids content, depending upon the particular polymer and brine used. Gellation rates are frequently faster when using said brines. Such oil field brines commonly contain varying amounts of sodium chloride, calcium chloride, magnesium chloride, etc. Sodium chloride is usually present in the greatest concentration.

Generally speaking, water having a low (or essentially none) total dissolved solids content is the preferred medium for preparing the gels described herein. Generally speaking, when brines are used suitable gels can be obtained when the total dissolved solids content is not greater than about 60,000, and the amount of polyvalent metal ions such as calcium, magnesium, etc., is not greater than about 6,000.

However, when using polyacrylamides and related polymers having not more than about 14 percent of the carboxamide groups hydrolyzed to carboxyl groups, water having a total dissolved solids content greater than 60,000 ppm by weight can be used for preparing the gels used in the present invention. Good results can be obtained with such polymers when using brines having a total dissolved solids content much greater than about 60,000 ppm by weight, e.g., up to at least about 174,000 ppm by weight. Furthermore, of said total dissolved solids, the amount of polyvalent metal ions such as calcium, magnesium, etc., can be greater than 6,000 ppm by weight. Good results can be obtained when using brines having greater than 12,000 ppm by weight of said polyvalent metal ions.

Another advantage in using strong field produced brines in preparing the aqueous gels described herein, in addition to the economic advantage of using readily available materials, is that the problem of disposing of such brines is lessened.

The word "water" is used generically herein and in the claims, unless otherwise specified, to include the above-described brines, fresh water, and other aqueous media which can be gelled in accordance with the invention.

Suitable reducing agents which can be used in the practice of the invention include sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, and others; and nonsulfur-containing compounds such as hydroquinone, ferrous chloride, p-hydrazinobenzoic acid, hydrazine phosphite, hydrazine dichloride, and others. Some of the above reducing agents act more quickly than others, for example, sodium thiosulfate usually reacts slowly in the absence of heat, e.g., heating to about 125°–130° F. The presently most preferred reducing agents are sodium hydrosulfite or potassium hydrosulfite, and sodium or potassium thiosulfate.

The amount of reducing agent to be used in preparing the gels used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent metal compound to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

Various methods can be used for preparing the aqueous gels used in the practice of the invention. Either the metal-containing compound or the reducing agent can be first added to a solution or dispersion of the polymer in water or other aqueous medium, or said metal-containing compound and said reducing agent can be added simultaneously to the solution or aqueous medium containing the polymer. Generally speaking, where convenient, the preferred method is to first disperse the polymer in the water or other aqueous medium. The metal-containing compound is then added to the solution or aqueous medium containing the polymer and the reducing agent, with stirring. The reducing agent is then added to the dispersion of polymer, with stirring. Gellation starts as soon as reduction of some of the higher valence metal in the starting polyvalent metal-containing compound to a lower valence state occurs. The newly-formed lower valence metal ions, for example +3 chromium obtained from +6 chromium, effect rapid crosslinking of the polymer and gellation of the solution or aqueous medium containing same.

It is also within the scope of the invention to prepare a dry mixture of the polymer, the metal-containing compound and the reducing agent, in proper proportions, and then add this dry mixture to the proper amount of water.

An advantage of the invention is that ordinary ambient temperatures and other conditions can be used in practically all instances in preparing the aqueous gels used in the practice of the invention or aqueous mediums containing same. However, in some instances, a small amount of heat may be desirable to aid in the formation of the gel, e.g., heating to a temperature of about 125°–130° F.

Aqueous gels used in the practice of the invention can be prepared having a wide range of viscosities or firmness ranging from low viscosity or highly mobile gels having a relatively low viscosity up to thick, viscous, somewhat elastic gels which are relatively nonmobile. The choice of gel viscosity or concentration will depend upon the use to be made of the gel. The actual viscosity and/or gel strength of the gel will depend upon the type and concentration of the polymer, the type and amount of starting polyvalent metal compound used, and the type and amount of reducing agent used.

One procedure which can be used to prepare said gels is to prepare a relatively concentrated or high viscosity gel and dilute same to a viscosity or concentration suited for the actual use of the gel. In many instances, this procedure results in a more stable gel, in addition to the advantages mentioned above. This should be taken into consideration since in the practice of the present invention highly stable gels are not, generally speaking, desirable. Gels having good initial stability sufficient to permit pumping and placement in the formation to fracture same, but which will break down with time and/or temperature to permit easy well clean-up are most useful in the practice of the present invention. Generally speaking, it is preferred that said gels have a stability, e.g., viscous life, within the range of about 15 minutes to about 12 hours.

When employing said dilution technique a starting solution or dispersion of polymer containing, for example, 1,000 to 10,000 ppm (0.1 to 1 wt. percent), or more, of polymer can be used. This solution or dispersion is then gelled by the addition of suitable amounts of polyvalent metal compound and reducing agent. After gellation has proceeded to the desired extent, the resulting gel can be diluted with water to the concentration or viscosity most suited for its intended use. The more concentrated polymer solutions or dispersions usually have a faster rate of gellation. Thus, in most instances, it will be preferred to carry out the dilution soon after the components of the gel have been added to the water or other aqueous medium, e.g., within about 5 to 30 minutes. Preferably, the concentration of the polymer in the "concentrated gel" will be at least twice that in the final gel. Dilution of the gel retards the rate of gellation. Thus, this dilution technique can be employed to control the gellation rate, if desired. One advantage of said dilution technique is that it is usually more convenient to weigh out and handle the larger quantities of reagents.

Generally speaking, the pH of the final solution of the gelling reagents is preferably less than 7, more preferably in the order of 6. In general, pH is not controlling, but higher pH values retard gellation rate. In general, the pH of the gelling solution will depend upon the reducing agent used. If desired, the pH can be adjusted by the addition of a suitable acid, depending upon the reducing agent used.

Herein and in the claims, unless otherwise specified, the aqueous gels used in the practice of the invention are defined for convenience, and not by way of limitation, in terms of the amount of polymer contained therein, irrespective of whether or not all the polymer has entered into the gel-forming reaction. For example, a 1 weight percent or 10,000 ppm gel is a gel which was prepared from a starting polymer solution or dispersion which contained 1 weight percent of 10,000 ppm by weight of polymer. The same system is employed for the gels prepared by the above-described dilution technique.

The following examples will serve to further illustrate the invention.

EXAMPLE I

A series of runs was made to illustrate the formation of aqueous gels. For these runs a stock solution was prepared by dissolving 6 grams of a substantially linear polyacrylamide in 2 liters of Bartlesville tap water. Said polyacrylamide was a commercially available material having a molecular weight of about $10 \times 10^6$, a nitrogen content of about 12 weight percent, and was about 21 percent hydrolyzed. The resulting solution contained about 3,000 ppm of said polyacrylamide. To individual 200 ml portions of this stock solution there were added varying amounts of a 10 weight percent solution of $Na_2S_2O_4$ in distilled water, with stirring for 10 seconds; and then varying amounts of a 10 weight percent solution of $Na_2Cr_2O_7 \cdot 2H_2O$ in distilled water, with stirring for 10 minutes. Gels were formed in each instance. The results of these test runs are set forth in Table I below.

TABLE I

| No. | $Na_2Cr_2O_7 \cdot 2H_2O$ grams | $Na_2S_2O_4$ grams | Apparent Viscosities, $cp^{(1)}$ | |
|---|---|---|---|---|
| | | | 1 minute | 48 hours |
| 1 | 0 | 0 | 28 | 30 |
| 2 | 0.025 | 0.025 | 38 | 37 |
| 3 | 0.05 | 0.05 | 49 | 36 |
| 4 | 0.05 | 0.10 | 35 | 56 |
| 5 | 0.10 | 0.10 | 41 | 47.5 |
| 6 | 0.10 | 0.15 | 34 | 53 |
| 7 | 0.15 | 0.15 | 28 | 50 |
| 8 | 0.25 | 0.25 | 42 | 80 |

(1) Model 35, Fann VG meter (300 rpm)

The above data indicate that with increasing amounts of $Na_2Cr_2O_7 \cdot 2H_2O$, with sufficient reducing agent present to reduce $Cr^{+6}$ to $Cr^{+3}$, the rate of gellation increases. The data also indicate that for a given amount of $Na_2Cr_2O_7 \cdot 2H_2O$, as the amount of reducing agent present increases, the overall rate of gellation increases.

The gels obtained in the above runs were stable gels at ordinary conditions of temperature. However, in many instances such as when used in deep high temperature wells, e.g., formation temperatures greater than about 200° F., such gels are useful in the practice of the present invention because they will break down after exposure to such temperatures for a given period of time.

EXAMPLE II

A series of aqueous gels was prepared using various commercially available polyacrylamides having different molecular weights and different amounts of the carboxamide groups therein hydrolyzed to carboxylic groups. Said gels were prepared using a typical sample of brine produced in the East Hull Silk Field in Archer County, Texas. This brine analyzed as follows:

|  | ppm by weight |
|---|---|
| NaCl | 124,000 |
| $CaCl_2$ | 34,200 |
| $MgCl_2 \cdot 2H_2O$ | 16,000 |
|  | 174,200 |

Each of the aqueous gels tested contained 2,000 ppm by weight of polymer and was prepared as follows. Two grams of each polymer were added to 1 liter of said brine. To each of the resulting solutions there was added, with stirring, an amount of a 10 weight percent solution of sodium hydro-sulfite sufficient to provide 300 ppm by weight of $Na_2S_2O_4$. There was then added, with stirring, an amount of a 10 weight percent solution of sodium dichromate sufficient to provide 300 ppm of $Na_2Cr_2O_7 \cdot 2H_2O$. Properties of each of the resulting gels, or solutions, are set forth in Table II below.

TABLE II

| Polymer | Molecular Weight | Percent Hydrolyzed | Polymer Solution Viscosity[1] cp. | Viscosity[2] at 72 hrs. cp. | Remarks |
|---|---|---|---|---|---|
| PF 1160 | $15 \times 10^6$ | 3.6 | 5.4 | >100,000 | clear solution without precipitate; excellent gel |
| PF 1110 | $8 \times 10^6$ | 11 | 11.5 | >100,000 | clear solution; gel not as smooth as PF 1160 gel |
| WC 500 | $3.5 \times 10^6$ | 15 | 4.4 | 2.4 | clear solution, but did not form gel |
| DP 1000 | $10 \times 10^6$ | 21 | 5.9 | 2.3 | solution precipitated; gelled, but gel broke in 24 hrs. |
| PF 1120 | $16 \times 10^6$ | 25 | 6.3 | 2.1 | solution turbid; gelled, but gel broke in 24 hrs. |
| WC 773 | $16 \times 10^6$ | 35 | 3.3 | 2.5 | clear solution, but did not form gel |
| PF 1130 | $10.5 \times 10^6$ | 40 | 2.7 |  | solution badly precipitated; did not form gel |

(1) Measured on Brookfield viscometer at 6 rpm, after solution hydrated 24 hours.
(2) Measured on Brookfield viscometer at 6 rpm.

Additional test runs were made on other polyacrylamide solutions, gelled and ungelled, containing 1,500, 3,000, and 10,000 ppm by weight of polyacrylamides having molecular weights and percent hydrolyzed values comparable to those set forth in Table II above. These runs were made using a synthetic brine containing approximately 86,000 ppm by weight total dissolved solids. The results obtained were essentially the same as set forth in Table I.

The gels from Runs 1 and 2 in the above Table II were good stable gels and are well suited for injection into nonfractured porous formation for water diversion purposes. However, such gels would also be useful as fracturing fluids in deep high temperature wells, as described above, because they would break down upon exposure to the high temperatures there existing for a given period of time. The polymers used in Runs 3, 6, and 7 did not form gels. It would be necessary to use a water containing less dissolved solids in order to obtain gels from these polymers. Gels have been made from the polymers used in said Runs 3, 6, and 7 when using fresh water. The gels in Runs 4 and 5 broke down within 24 hours at room temperature to a viscosity approaching that of water. These gels would be useful in the practice of the present invention.

EXAMPLE III

An aqueous gel was prepared using the PF 1160 polyacrylamide of Run 1 in Example II, and a strong field brine containing about 100,000 ppm total dissolved solids. The gel contained 3,000 ppm by weight of said polymer. Gellation was effected by the addition of 1,000 ppm of $Na_2Cr_2O_7 \cdot 2H_2O$ and 1,000 ppm of $Na_2S_2O_4$. Two hours after addition of said gelling agents, the viscosity of the gel was too great to measure on a Brookfield viscometer.

The gel was allowed to stand at room temperature for about 2 weeks. There was no apparent change. A sample of the gel was placed in a glass container and then heated in a steel bomb for 18 hours at 360°F. After cooling to room temperature, inspection showed the gel had completely broken down. The fluid remaining in the glass container exhibited a viscosity which visually was like that of water.

The 360° F. temperature in the above test is comparable to the 350° F. formation temperatures in deep Ellenburger gas wells in the Gomez field, Pecos County, Texas.

There are several method by which gelled solutions of polyacrylamides and related polymers (as defined herein) can be caused to break down with time so that their final viscosity approximates that for ungelled polymer solution, or water. One method is to use excessive amounts of the gelling agents which will produce adequate viscosity and gel life required during the fracture treatment, but which will subsequently cause breakdown to a thin solution having a viscosity approaching or essentially the same as water, allowing rapid well clean-up following a fracture treatment.

As discussed elsewhere herein, another method of causing gelled solutions of polyacrylamides and related polymers to break down to viscosities approaching that of water is to expose said gels to elevated temperatures. Said gels, even gels which are normally stable for long periods of time at ordinary temperatures, are self-breaking at elevated temperatures, and the breaking time decreases with increases in temperature and increased time of exposure to said elevated temperatures.

Still another method for causing said gels to break down with time to viscosities approaching the viscosity of water is to use brines, e.g., water containing increased amounts of dissolved solids, in preparing the gels. Significantly less gelling agents are required to gel solutions of polymers made with brines than are required to gel solutions made with fresh water. As the salinity of the water increases, the rate of gellation increases. Also, for a given amount of polymer and given amounts of gelling agents, the stability or life span of the gel decreases with increasing salinity of the water.

Thus, the rates of gellation and solutions of polyacrylamides and related polymers (as defined herein), and/or the life span of the resulting gel, can be tailored in accordance with conditions encountered in the field. This can be done by taking into consideration the temperature of the formation where the gel is to be used, the amount of gelling agents used in preparing the gels, the water used in preparing the gels, and the particular polymer used. A gel can be tailored to have a life span of 18, 12, 8, 4, 2 hours, or less, so that the gel will break down to a viscosity approaching that of water within the time selected. This will permit ready well clean-up after the fracturing treatment and permit ready removal of gel residue, such as by producing of formation fluids. Gels can be prepared which will break back to viscosities of less than about 20 centipoises, or even to the viscosity of water, by proper consideration of the above-mentioned factors.

One presently preferred method of carrying out a fracturing operation in accordance with the present invention comprises preparing a base fracturing fluid comprising a solution of a polymer (as defined herein), adding to this base fluid (a) a polyvalent metal compound such as sodium dichromate or (b) a reducing agent such as sodium hydrosulfite or sodium thiosulfate, pumping a slug of said base fracturing fluid down the well and into the formation under sufficient pressure to create the fracture, and during said pumping adding to said base fracturing fluid the other of said reagents (a) and (b) which was not previously added thereto. It is also within the scope of the invention to incorporate all the components of the aqueous gel into a stream of water while it is being pumped, e.g., into a well. For example, polyacrylamide could be added first to the flowing stream of water and the other components added subsequently in any suitable order. Turbulent flow conditions in the pipe will provide proper mixing and gellation will occur during said pumping.

In the practice of the invention, the fracturing fluids can be injected into the formation at any suitable pressures sufficient to overcome the weight of the overburden. As will be understood by those skilled in the art, this will vary from region to region. However, generally speaking, said pressures will be in the range of from 0.5 to 1.5 psi per foot of well depth.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A method of fracturing a subterranean porous formation penetrated by a wellbore, which method comprises injecting down the well and into said formation, at a pressure sufficient to fracture the formation, a fracturing fluid comprising an aqueous gel, and wherein said gel comprises water to which there has been added:

a water-thickening amount of a water-dispersible polymer selected from the group consisting of: polyacrylamides and polymethacrylamides wherein up to about 75 percent of the carboxamide groups can be hydrolyzed to carboxyl groups; crosslinked polyacrylamides and crosslinked polyacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substituents which contain from one to four carbon atoms; copolymers of acrylamide with another ethylenically unsaturated monomer copolymerizable therewith, sufficient acrylamide being present in the monomer mixture to impart said water-dispersible properties to the resulting copolymer when it is mixed with water, and wherein up to about 75 percent of the carboxamide groups can be hydrolyzed to carboxyl groups; and mixture of said polymers;

a sensible amount of a water-soluble compound of a polyvalent metal wherein the metal present is capable of being reduced to a lower polyvalent valence state and which is sufficient to gel said water when the valence of at least a portion of said metal is reduced to said lower valence state; and an amount of a water-soluble reducing agent which is effective to reduce at least a portion of said metal to said lower valence state.

2. A method according to claim 1 wherein said aqueous gel comprises water to which there has been added:

from 0.0025 to 5 percent of said polymer, based upon the weight of said water;

from 0.05 to 60 weight percent of said polyvalent metal compound based upon the weight of said polymer;

from 0.1 to at least about 200 percent of the stoichiometric amount of said reducing agent required to reduce said polyvalent metal to said lower polyvalent valence state; and wherein the initial total dissolved solids content of said water is not greater than about 60,000 ppm by weight, and of said dissolved solids, the amount of polyvalent metal ions present is not greater than about 6,000 ppm by weight.

3. A method according to claim 2 wherein said total dissolved solids content of said water is not greater than about 40,000 ppm by weight, and the amount of said polyvalent metal ions is not greater than about 3,000 ppm by weight.

4. A method according to claim 2 wherein said polymer is a substantially linear polymer of acrylamide.

5. A method according to claim 4 wherein said compound of a polyvalent metal is a compound of chromium wherein the valence of the chromium is +6 and the valence of at least a portion of said chromium is reduced to +3.

6. A method according to claim 5 wherein said chromium compound is selected from the group consisting of ammonium chromate, ammonium dichromate, the alkali metal chromates and dichromates, chromium trioxide, and mixtures thereof.

7. A method according to claim 6 wherein said reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, ferrous chloride, p-hydrazinobenzoic acid, hydrazine phosphite, hydrazine dihydrochloride, and mixtures thereof.

8. A method according to claim 7 wherein:
said chromium compound is sodium dichromate or potassium dichromate; and
said reducing agent is sodium hydrosulfite, potassium hydrosulfite, sodium thiosulfate, or potassium thiosulfate.

9. A method according to claim 2 wherein:
said polymer is a substantially linear polyacrylamide;
said polyvalent metal compound is sodium dichromate; and
said reducing agent is sodium hydrosulfite or sodium thiosulfate.

10. A method according to claim 1 wherein:
said polymer is selected from the group consisting of: polyacrylamides and polymethacrylamides wherein from 0.1 to about 14 percent of the carboxamide groups are hydrolyzed to carboxyl groups; crosslinked polyacrylamides and crosslinked polyacrylamides wherein from 0.1 to about 14 percent of the carboxamide groups are hydrolyzed to carboxyl groups; copolymers of acrylamide with another ethylenically unsaturated monomer copolymerizable therewith, sufficient acrylamide being present in the monomer mixture to impart said water-dispersible properties to the resulting copolymer when it is mixed with water, and wherein from 0.1 to about 14 percent of the carboxamide groups are hydrolyzed to carboxyl groups; and mixtures of said polymers; and
wherein the initial total dissolved solids content of said water is greater than about 60,000 ppm by weight.

11. A method according to claim 10 wherein said aqueous gel comprises water to which there has been added:
from 0.0025 to 5 weight percent of said polymer, based upon the weight of said water;
from 0.05 to 60 weight percent of said polyvalent metal compound based on the weight of said polymer; and
from 0.1 to at least about 200 percent of the stoichiometric amount of said reducing agent required to reduce said polyvalent metal to said lower polyvalent valence state.

12. A method according to claim 11 wherein said polymer is a substantially linear polymer of acrylamide.

13. A method according to claim 12 wherein said compound of a polyvalent metal is a compound of chromium wherein the valence of the chromium is +6 and the valence of at least a portion of said chromium is reduced to +3.

14. A method according to claim 13 wherein:
said chromium compound is selected from the group consisting of ammonium chromate, ammonium dichromate, the alkali metal chromates and dichromates, chromium trioxide, and mixtures thereof; and
said reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, ferrous chloride, p-hydrazinobenzoic acid, hydrazine phosphite, hydrazine dihydrochloride, and mixtures thereof.

15. A method according to claim 10 wherein:
said polymer is a substantially linear polyacrylamide;
said polyvalent metal compound is sodium dichromate; and
said reducing agent is sodium hydrosulfite or sodium thiosulfate.

16. A method according to claim 1 wherein:
said formation is susceptible to attack by an acid;
a slug of a fracturing fluid comprising said gel is injected into said formation; and
a slug of an acid is injected into said formation subsequent to the injection of said fracturing fluid.

17. A method according to claim 16 wherein a slug of a spacer fluid is injected into said formation after the injection of said fracturing fluid and prior to injecting said acid.

18. A method according to claim 17 wherein said acid is selected from the group consisting of hydrochloric acid, formic acid, acetic acid, and mixtures thereof.

19. A method according to claim 18 wherein said aqueous gel comprises water to which there has been added:
from 0.01 to 1.5 weight percent of said polymer, based upon the weight of said water;
from 0.5 to 40 weight percent of said polyvalent metal compound, based upon the weight of said polymer; and
from 0.1 to at least about 150 percent of the stoichiometric amount of said reducing agent required to reduce said polyvalent metal to said lower polyvalent valence state.

20. A method according to claim 19 wherein:
said polymer is a substantially linear polyacrylamide;
said polyvalent metal compound is an alkali metal dichromate; and
said reducing agent is sodium hydrosulfite or sodium thiosulfate.

21. A method according to claim 20 wherein:
said polyvalent metal compound is sodium dichromate; and
said acid comprises a solution of hydrochloric acid.

22. A method according to claim 20 wherein:
said polymer is a substantially linear polyacrylamide wherein from 0.1 to about 14 percent of the carboxamide groups are hydrolyzed to carboxyl groups;
said polyvalent metal compound is sodium dichromate; and said acid comprises a solution of hydrochloric acid.

23. A method according to claim 1 wherein the temperature of said formation is greater than about 200° F. and the life span of said gel is such that it breaks down to a viscosity approaching that of water in less than about 18 hours.

24. A method according to claim 1 wherein an excessive amount of said gelling agents is used relative to the amount of said polymer, so that the life span of said gel is such that it breaks down to a viscosity approaching that of water in less than about 18 hours.

25. A method of fracturing a subterranean formation penetrated by a wellbore, which method comprises, in combination, the steps of:
   A. forming a base fracturing fluid by adding to a given quantity of water from 0.01 to 1.5 weight percent, based on the weight of said water, of a polymer selected from the group consisting of: polyacrylamides and polymethacrylamides wherein up to about 75 percent of the carboxamide groups can be hydrolyzed to carboxyl groups; crosslinked polyacrylamides and crosslinked polyacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substituents which contain from one to four carbon atoms; copolymers of acrylamide with another ethylenically unsaturated monomer copolymerizable therewith; sufficient acrylamide being present in the monomer mixture to impart said water-dispersible properties to the resulting copolymer when it is mixed with water, and wherein up to about 75 percent of the carboxamide groups can be hydrolyzed to carboxyl groups; and mixtures of said polymers;
   B. adding to said base fracturing fluid one of (a) from 0.5 to 40 weight percent of a water-soluble compound of chromium wherein the valence of the chromium is +6 and which is sufficient to gel said water when the valence of at least a portion of said chromium is reduced from +6 to +3, or (b) from 0.5 to at least about 150 percent of the stoichiometric amount of a water-soluble reducing agent which is effective to reduce the valence of said chromium from +6 to +3;
   C. pumping a slug of said base fracturing fluid of step (B) down said well and into said formation under a pressure sufficient to create a fracture in said formation; and
   D. during said pumping adding to said base fracturing fluid the other of said reagents (a) and (b) which was not added thereto in said step (B).

26. A method according to claim 25 wherein:
said polymer is a substantially linear polyacrylamide;
said chromium compound is sodium dichromate or potassium dichromate;
said reducing agent is sodium hydrosulfite or sodium thiosulfate; and
wherein said water has an initial total dissolved solids content not greater than about 60,000 ppm by weight, and of said dissolved solids, the amount of polyvalent metal ions present is not greater than about 6,000 ppm by weight.

27. A method according to claim 25 wherein:
said polymer is a substantially linear polyacrylamide wherein from 0.1 to about 14 percent of the carboxamide groups are hydrolyzed to carboxyl groups;
said chromium compound is sodium dichromate or potassium dichromate;
said reducing agent is sodium hydrosulfite or sodium thiosulfate; and
wherein the initial total dissolved solids content of said water is greater than about 60,000 ppm by weight.

28. A method according to claim 25 wherein said formation is susceptible to attach by an acid, and said method comprises in further combination, the step of:
   E. injecting a slug of an acid into said formation subsequent to the injection of said fracturing fluid as in said steps (C) and (D).

29. A method according to claim 28 wherein a slug of a spacer fluid is injected into said formation after said steps (C) and (D) and prior to said step (E).

30. A method according to claim 28 wherein:
said polymer is a substantially linear polyacrylamide;
said chromium compound is sodium dichromate or potassium dichromate;
said reducing agent is sodium hydrosulfite or sodium thiosulfate;
said acid comprises a solution of hydrochloric acid; and
wherein said water has an initial total dissolved solids content not greater than about 60,000 ppm by weight, and of said dissolved solids, the amount of polyvalent metal ions present is not greater than about 60,000 ppm by weight, and of said dissolved solids, the amount of polyvalent metal ions present is not greater than about 6,000 ppm by weight.

31. A method according to claim 28 wherein:
said polymer is a substantially linear polyacrylamide;
said chromium compound is sodium dichromate or potassium dichromate;
said reducing agent is sodium hydrosulfite or sodium thiosulfate;
said acid comprises a solution of hydrochloric acid; and
wherein the initial total dissolved solids content of said water is greater than about 60,000 ppm by weight.

* * * * *

UNITED STATES PATENT OFFICE

CERTIFICATE OF CORRECTION

Patent No. 3,727,689                      Dated: April 17, 1973

Richard L. Clampitt

It is certified that error appears in the above-identified patent and that said Letters Patent are hereby corrected as shown below:

Column 2, line 25, change "polyacrylamides" to --- polymethacrylamides ---; column 6, line 46, change "above" to --- herein ---; column 7, line 15, change "polyacrylamides" to --- polymethacrylamides ---; column 16, line 20, change "polyacrylamides" to --- polymethacrylamides ---; column 16, line 35, change "mixture" to --- mixtures ---; column 17, line 40, change "polyacrylamides" to --- polymethacrylamides ---; column 17, line 60, change "on" to --- upon ---; and column 19, line 23, change "polyacrylamides" to --- polymethacrylamides ---.

Signed and sealed this 5th day of February 1974.

(SEAL)
Attest:

EDWARD M. FLETCHER, JR.          RENE D. TEGTMEYER
Attesting Officer                 Acting Commissioner of Patents